(12) United States Patent
Agyik

(10) Patent No.: US 12,465,031 B2
(45) Date of Patent: Nov. 11, 2025

(54) TROLLING RIG

(71) Applicant: Gragyik Pty Ltd, Burleigh Heads (AU)

(72) Inventor: Alan Agyik, Palm Beach (AU)

(73) Assignee: Gragyik Pty Ltd, Burleigh Heads QLD (AU)

( * ) Notice: Subject to any disclaimer, the term of this patent is extended or adjusted under 35 U.S.C. 154(b) by 13 days.

(21) Appl. No.: 18/471,714

(22) Filed: Sep. 21, 2023

(65) Prior Publication Data

US 2024/0099286 A1 Mar. 28, 2024

(30) Foreign Application Priority Data

Sep. 22, 2022 (AU) .................. 2022902749

(51) Int. Cl.
*A01K 91/08* (2006.01)
(52) U.S. Cl.
CPC .................. *A01K 91/08* (2013.01)
(58) Field of Classification Search
CPC .................. A01K 91/08; A01K 83/06
USPC .................. 43/44.2, 43.13, 44.6, 42.39, 44.4
See application file for complete search history.

(56) References Cited

U.S. PATENT DOCUMENTS

| | | | | |
|---|---|---|---|---|
| 2,461,755 A * | 2/1949 | Miller | A01K 83/06 43/44.8 |
| 3,645,031 A * | 2/1972 | Egles | A01K 83/06 43/44.2 |
| 4,067,135 A * | 1/1978 | Martin | A01K 83/06 43/44.2 |
| 4,126,956 A * | 11/1978 | Bayer | A01K 83/06 43/4.5 |
| 4,796,376 A * | 1/1989 | Schlaegel | A01K 83/06 43/41 |
| 4,848,023 A * | 7/1989 | Ryder | A01K 83/06 43/44.4 |
| 4,869,014 A * | 9/1989 | Francklyn | A01K 83/06 43/42.49 |
| 5,119,581 A * | 6/1992 | Rudolph | A01K 85/16 43/42.22 |
| 5,377,442 A * | 1/1995 | Gariglio | A01K 83/06 43/44.4 |
| 5,537,770 A * | 7/1996 | Storm | A01K 85/16 43/42.22 |
| 5,893,232 A * | 4/1999 | Horton | A01K 83/06 43/44.4 |
| 7,263,798 B2 * | 9/2007 | Nichols | A01K 85/18 43/42.26 |
| 2019/0082666 A1 * | 3/2019 | Copeland | A01K 95/00 |

OTHER PUBLICATIONS

Vuoksi Vieheet Finland, webpage, http://www.vuoksivieheet.net/fi/, p. 1-2.

* cited by examiner

*Primary Examiner* — Christopher D Hutchens
(74) *Attorney, Agent, or Firm* — CARTER, DELUCA & FARRELL LLP; George Likourezos

(57) ABSTRACT

A trolling device is provided, the trolling device comprising a body for receiving dead bait; a securer for releasably securing the dead bait received by the body; and a stabiliser for stabilising the body when moving in water, wherein the securer and stabiliser are connected with the body. Related systems, kits, and methods are also provided.

19 Claims, 15 Drawing Sheets

TROLLING RIG

CROSS-REFERENCE TO RELATED APPLICATIONS

The present application claims priority to Provisional Application No. 2022902749, filed in the Australian Patent Office on Sep. 22, 2022, which is expressly incorporated herein in its entirety by reference thereto.

FIELD

This invention relates to fishing. More specifically, the invention relates to line fishing, particularly trolling.

BACKGROUND

The human activity of catching fish, referred to as fishing, has occurred since prehistory and is currently performed throughout the world. Commercial fishing is performed on a vast scale, often using boats and industrial fishing nets. Smaller scale fishing is also common for both obtaining food and recreation—fishing rod or fishing pole arrangements are regularly used in this context.

Fishing rods are typically used with a suitable arrangement of line, bait, and hook. A fish attempts to eat the bait, is caught on the hook, and can be brought in from the water using the line, typically by drawing in the line using a reel or similar. A wide variety of lines, baits, and hooks, and various other tackle (such as sinkers, swivels, and leaders) are commonly used for rod fishing.

Trolling is a form of fishing wherein baited lines, typically mounted to a rod or pole, are drawn through water to attract fish to the moving bait. Both natural baits (e.g. shrimp, minnows, worms, and various insects) and artificial baits (typically referred to as lures) may be used for trolling. Trolling may be performed on a relatively small or recreational scale such as using a single fishing rod, or on relatively large or industrial scales such as using multiple poles installed on a fishing boat. In some cases, trolling is attempted using recreational water craft such as kayaks or jet skis.

Existing trolling approaches can be associated with at least certain challenges or difficulties. In particular, there can be challenges or difficulties with baiting for existing trolling approaches.

Trolling generally relies, at least in part, on suitable movement of bait through water to attract fish. Various trolling lures exist that are designed to respond in ways that attract attention of fish as moved through water. For example, 'swimbait' lures are commonly formed from soft plastic with tail-like appendages, presenting in a manner similar to a swimming bait fish as moved through water. Other trolling lures, such as 'spoon' lures and 'spinnerbait' lures, can reflect light as moved through water in order to flash or sparkle in an attractive manner.

Although artificial trolling lures may move in a manner that is attractive to fish, such lures generally lack certain other desirable properties of natural bait. In particular, natural bait can be highly effective for attracting fish by smell and/or taste.

Dead natural baits may be used for trolling. However, benefits of smell and/or taste are generally offset in this instance by less attractive movement through the water. Live baits may offer benefits in terms of both smell and/or taste and movement, however trolling using live baits typically requires significant skill to keep bait alive during baiting and trolling.

In consideration of the above, new baiting approaches for trolling would be desirable. In at least some instances, it would be particularly desirable if new approaches addressed the limitations of artificial trolling lures relating to attraction using smell and/or taste. In at least some instances, it would be particularly desirable if new approaches addressed the limitations of dead baits relating to attraction by movement. In at least some instances, it would be particularly desirable if new approaches addressed the limitations of live baits in relation to technical difficulties of baiting and trolling.

The reference to prior art in the background is not and should not be taken as an acknowledgement or suggestion that the referenced prior art forms part of the common general knowledge in Australia or in any other country or jurisdiction.

SUMMARY

A broad form of the present invention provides a trolling device for trolling using dead bait. Suitably, the trolling device is connectable with line and dead bait, for trolling using the dead bait.

In a first aspect, the invention provides a trolling device comprising a body for receiving bait; a securer for releasably securing the bait received by the body; and a stabiliser for stabilising the body when moving in water, wherein the securer and stabiliser are of or connected with the body.

Suitably, the body of the trolling device comprises a receiving section or compartment for receiving bait or a part thereof. In embodiments, the body comprises a body cavity, for receiving bait or a part thereof. Suitably, the body cavity is bordered by one or more body walls.

Suitably, the body of the device of the first aspect comprises a first or front body end; and a second or rear body end. Suitably, the one or more body walls of the body comprises a first or top wall or wall portion; and a second or bottom wall or wall portion.

In embodiments, the first body end of the body of the device is a closed or closable end. In embodiments, the device is connectable with line at or near the first body end.

In embodiments, the second body end of the body is an open or openable end. In embodiments, the body cavity of the body can receive bait via the open or openable body end.

In embodiments, the body of the device narrows towards the first body end. In embodiments, the body cavity of the body narrows towards the first body end.

The body of the device, or a portion thereof, may be substantially cone-shaped. The body of the device, or a portion thereof, may be substantially V-shaped.

The body of the device may comprise one or more extensions or legs. Suitably, the one or more extensions are of, extend from or from near, or extend to or towards, the second body end. In embodiments, the body of the device comprises a first or top extension or leg; and a second or bottom extension or leg. The first and second extensions of the body may be in a V or V-like configuration.

In embodiments, the body cavity of the body is substantially cone-shaped, such as in the shape of a truncated cone.

In embodiments, the securer of the trolling device of the first aspect is moveable. The securer may be movable between a securing position, orientation, or configuration for securing bait received by the body, and a releasing position, orientation, or configuration for releasing bait received by the body.

In embodiments wherein the securer of the device is moveable, suitably, the securer is movably connected with the body of the device. In embodiments, the securer is movably connected to or near to the first or top wall or wall portion of the body of the device.

The securer of the device may comprise a connector for connecting the securer with the body of the device. The connector may be a lever or arm of the securer. In embodiments, the connector is movably connected with the body at or near a first end of the connector. In embodiments, the connector is rotatably connected with the body at or near the first end of the connector. In embodiments, the connector is pivotally connected with the body at or near the first end of the connector.

Suitably, rotation or pivoting of the connector of the securer of the device, relative to the body of the device, moves the securer between the securing position, orientation, or configuration, and the releasing position, orientation, or configuration.

In embodiments, the securer of the trolling device of the first aspect comprises an insertion portion for insertion into bait to secure the bait. In embodiments, the insertion portion comprises a prong or barb for insertion into bait to secure the bait. In embodiments, the prong or barb of the securer for insertion into the bait extends from the connector of the securer at or near a second end of the connector.

In embodiments, when the securer is in the securing position, orientation, or configuration, the insertion portion of the securer is at or towards the second end of the body of the device, or the one or more extensions extending from or from near the second end of the body.

In embodiments, when the securer is in the securing position, orientation, or configuration, the connector portion of the securer is at or towards the first wall or wall portion of the body of the device, and/or the first extension of the body.

In embodiments, when the securer is in the securing position, orientation, or configuration, the insertion portion of the securer extends towards the second wall or wall portion of the body of the device, and/or the second extension extending from or from near the second end of the body.

Suitably, when bait is received by the body of the device and the securer is in the securing position, orientation, or configuration, the insertion portion of the securer is inserted into the bait. Suitably, when bait is received by the body of the device and the securer is in the releasing position, orientation, or configuration, the insertion portion of the securer is withdrawn from the bait.

The body of the device of the first aspect may comprise a securer opening, such as an aperture, channel, groove, or slot, into or through which the securer, or a part thereof, moves from the releasing position, orientation, or configuration to the securing position, orientation, or configuration. In embodiments, the securer opening of the body is in or on the first wall or wall portion of the body of the device. In embodiments, the securer opening of the body is in or on the first extension of the body of the device.

In embodiments, the securer opening of the body is a slot or groove extending longitudinally along the body of the device. The securer slot or groove may extend from a position at or near the first body end of the body of the device to a position at or near the second body end of the body of the device.

In embodiments, the securer slot or groove extends along the first wall or wall portion of the body of the device. In embodiments, the securer slot or groove extends along the first extension of the body of the device.

Suitably, the stabiliser of the trolling device of the first aspect is or comprises a weight. The stabiliser may be a substantially solid weight. In embodiments, the stabiliser comprises a substantially prismatic stabiliser body. The stabiliser or stabiliser body may be substantially triangularly prismatic.

Suitably, the stabiliser or stabiliser body comprises one or more sides or surfaces for connection with the body of the device. In embodiments, the stabiliser or stabiliser body comprises one or more sides or surfaces for contact with water.

In embodiments, the stabiliser or stabiliser body comprises a substantially flat water-contact surface. The substantially flat water-contact surface may be substantially elongated. The substantially flat water-contact surface may be substantially rectangular.

In embodiments, the stabiliser or stabiliser body is connected at or towards the first body end of the body of the device. The stabiliser or stabiliser body may be in substantially fixed connection with the body of the device.

The trolling device of the first aspect may comprise one or more tackle supports, for connection of line and/or tackle with the device. Suitably, the one or more tackle supports are or comprise one or more tackle connectors for connection with line and/or tackle. The one or more tackle connectors may comprise apertures, channels, or slots or the like.

Suitably, the one or more tackle supports and/or tackle connectors are of or connected to the body of the device. In embodiments, one or more of the tackle supports and/or tackle connectors are at or near the first body end of the body of the device. In embodiments, one or more of the tackle supports and/or tackle connectors at or near the second body end of the body of the device. In embodiments, one or more of the tackle supports and/or tackle connectors are at or near the second extension of the body of the device, or an end thereof.

The one or more tackle supports of the device may comprise a shaft or rod. In embodiments, the shaft or rod of the tackle support extends between the first body end and the second body end of the body of the device.

The body of the device may comprise a tackle support slot or channel, wherein the tackle support of the device extends within the tackle support slot or channel. In embodiments, the tackle support comprises a shaft or rod, wherein the shaft or rod extends within a tackle support channel of the second wall or wall portion of the body of the device, between the first body end and the second body end.

In embodiments, the one or more tackle supports and/or tackle connectors of the device comprises a first or front tackle connector, for connection with line and/or tackle. The first tackle connector may comprise an aperture or channel. Suitably, the first tackle connector is at or near the first body end of the body of the device.

In embodiments, the first tackle connector comprises an aperture or channel at a first end of the shaft or rod of the tackle support. In embodiments, the first tackle connector extends out of or away from the tackle support channel at or near the first body end of the body of the device.

In embodiments, the one or more tackle supports and/or tackle connectors of the device comprises a second or rear tackle connector, for connection with line and/or tackle. The second tackle connector may comprise an aperture or channel. In embodiments, the second tackle connector is at or near the second body end of the body of the device. In embodiments, the second tackle connector is at or near the second extension of the body of the device, or an end thereof.

In embodiments, the second tackle connector comprises an aperture or channel at a second end of the shaft or rod of the tackle support. In embodiments, the second tackle connector extends out of or away from the tackle support channel at or near the second body end of the body of the device.

The trolling device may comprise one or more wings, fins, or bibs or the like for affecting movement or action of the device through water. Suitably, the one or more wings, fins, or bibs or the like are of or connected to the body of the device.

In embodiments, the device comprises a bib. Suitably, the bib comprises a first or top surface or face; and a second or bottom surface or face. In embodiments, the bib of the device extends from or from near the first body end of the body of the device. In embodiments, the bib extends from or from near the second wall or wall portion of the device. The bib may project downwards and outwards from the second wall or wall portion of the device at or near the first end of the body of the device.

In embodiments, the trolling device comprises a support or brace extending between the body of the device, or a portion thereof, and the bib. The support or brace may extend from the second wall or wall portion of the body of the device to the second surface of the bib.

In embodiments, the stabiliser of the trolling device is connected to the support extending between of the device and the bib. The substantially flat water-contact surface of the stabiliser may extend between the second wall or wall portion of the body of the device to the second surface of the bib.

A second aspect of the invention provides a system comprising the trolling device of the first aspect; and at least one of (a) fishing line and/or tackle and (b) dead bait, wherein the at least one of (a) and (b) is connected with the trolling device of the first aspect.

In embodiments of the system of the second aspect, the fishing line and/or tackle of (a) comprises line, leader, and/or trace. In embodiments, the line, leader, and/or trace is connected with the first tackle connector and/or the second tackle connector of the device.

In embodiments of the system of the second aspect, the fishing line and/or tackle of (a) comprises one or more hooks. In embodiments, the one or more hooks comprise a gang hook arrangement. In embodiments, the one or more hooks, such as the gang hook, is connected with the second tackle connector of the device.

In embodiments of the system of the second aspect, the fishing line and/or tackle of (a) comprises one or more lures. The one or more lures may be connected with the first tackle connector and/or the second tackle connector of the device.

In embodiments of the system of the second aspect, the dead bait of (b) comprises a bait fish. The dead bait may be a whole or substantially whole bait fish. In embodiments, the bait fish is a pilchard or sardine or the like.

In embodiments wherein the system of the second aspect comprises dead bait, suitably, at least a part of the dead bait is received by the body of the trolling device of the first aspect. In embodiments, a head portion of the bait fish, or a part thereof, is placed within the cavity of the body of the device. In embodiments, a head portion of the bait fish, or a part thereof, is placed adjacent or against an inner surface of one or more extensions of the body of the device.

In embodiments wherein the system of the second aspect comprises dead bait, suitably, at least a part of the dead bait is connected with the securer of the trolling device. In embodiments, the prong or barb of the securer is inserted into a part of the dead bait. In embodiments wherein the dead bait is a bait fish, the prong or barb of the securer may be inserted into a dorsal region of the bait fish, such as at or near a head portion of the bait fish.

In embodiments wherein the system of the second aspect comprises dead bait and one or more hooks, suitably, the one or more hooks are inserted into the dead bait. In embodiments wherein the dead bait is a bait fish, the one or more hooks may be inserted into a ventral region of the bait fish, such as an abdominal or belly portion of the bait fish.

The system of the second aspect may comprise a fishing rod or fishing pole, wherein the rod or pole is connected with the trolling device of the first aspect. Suitably, the rod or pole is connected with the trolling device via the fishing line and/or tackle of (a).

A third aspect of the invention provides a kit comprising the trolling device of the first aspect and fishing line and/or tackle for connection with the trolling device of the first aspect.

A fourth aspect of the invention provides a method of fishing, including a step of trolling using the trolling device of the first aspect.

In embodiments, the method of the fourth aspect is a method of trolling with dead bait connected with the trolling device of the first aspect.

In embodiments, the method of the fourth aspect is a method of trolling with a dead bait fish connected with the trolling device of the first aspect. Suitably, the method includes a step of moving the trolling device wherein movement of the dead bait fish connected with the trolling device through water resembles live swimming of the bait fish. Suitably, the step of moving the trolling device includes stabilising the body of the trolling device with the stabiliser of the device.

In embodiments, the method of the fourth aspect includes a step of attracting fish using a dead bait fish by (a) movement resembling live swimming of the bait fish; and (b) smell and/or taste of the dead bait fish.

In embodiments, the method of the fourth aspect is a method of trolling using a recreational water craft. The recreational water craft may be a kayak or jet ski or the like. Suitably, the method includes a step of moving the trolling device by moving the trolling device through water using the recreational water craft.

BRIEF DESCRIPTION OF THE DRAWINGS

The invention will be described hereinafter with reference to typical embodiments illustrated in the drawings and wherein.

DETAILED DESCRIPTION

Figure 1:
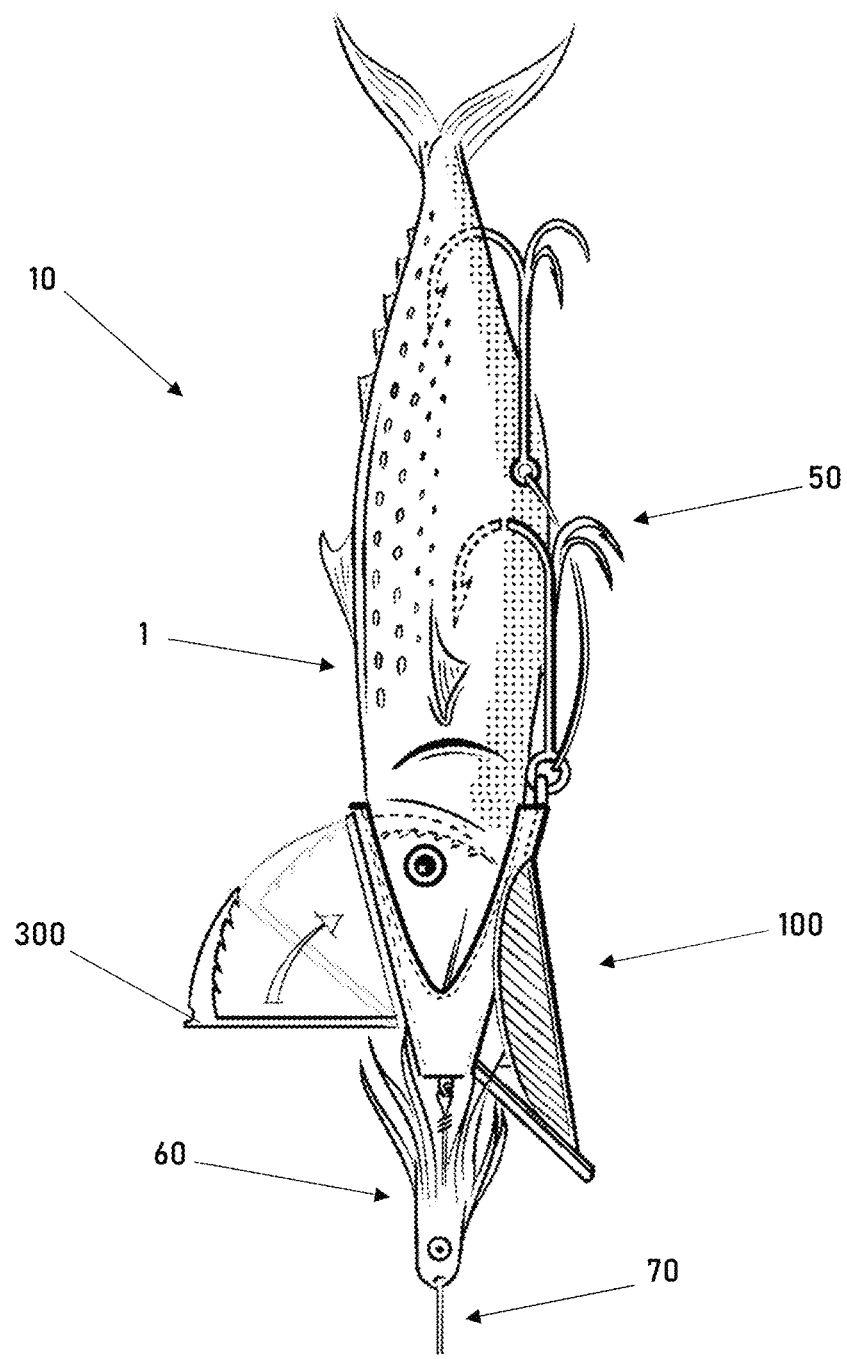
FIG. 1 sets forth a side view of an embodiment of a trolling system according to an aspect of the invention, system 10. System 10 comprises an embodiment of a trolling device according to an aspect of the invention, trolling device 100; and dead bait fish 1; gang hook 50; lure 60; and leader 70 connected with trolling device 100.
Figure 2:
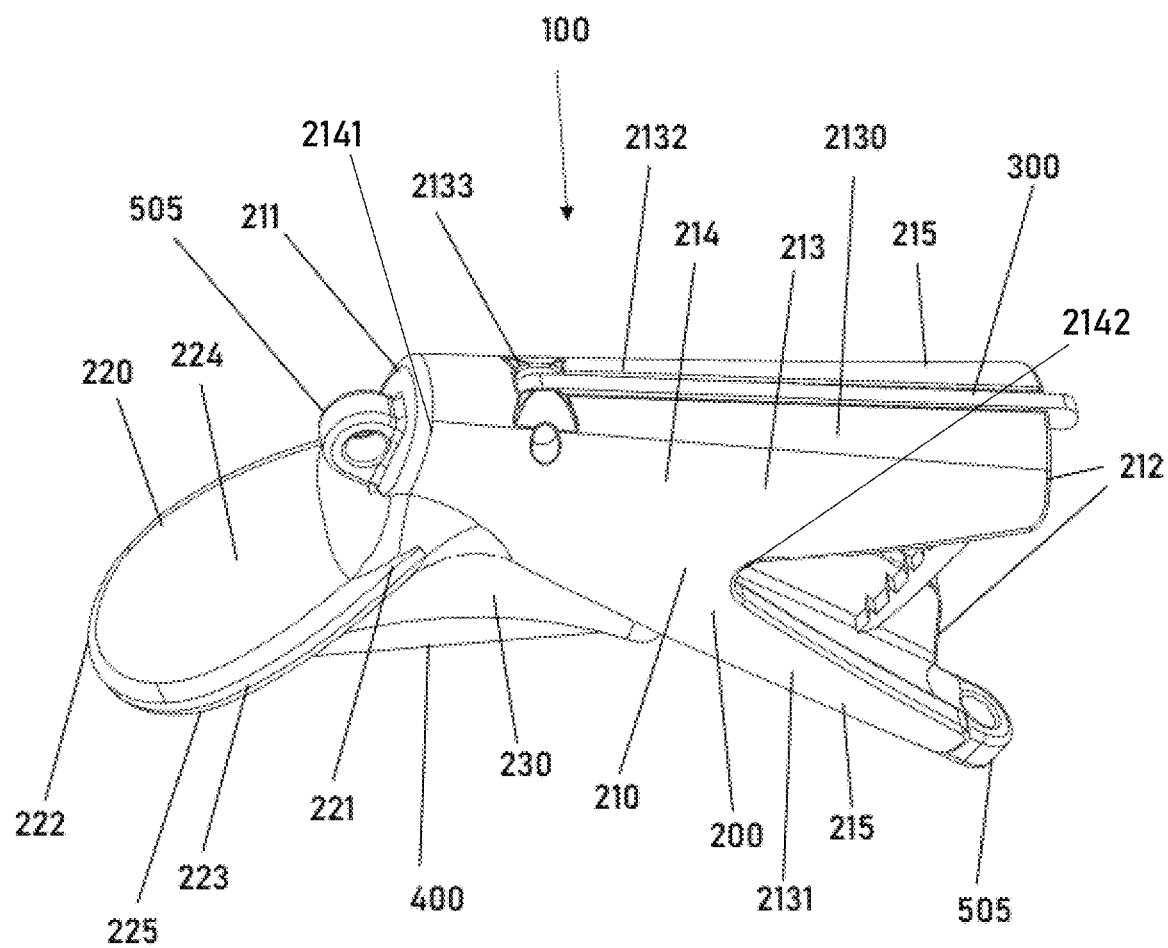
FIG. 2 sets forth a side perspective view of trolling device 100.
Figure 3:
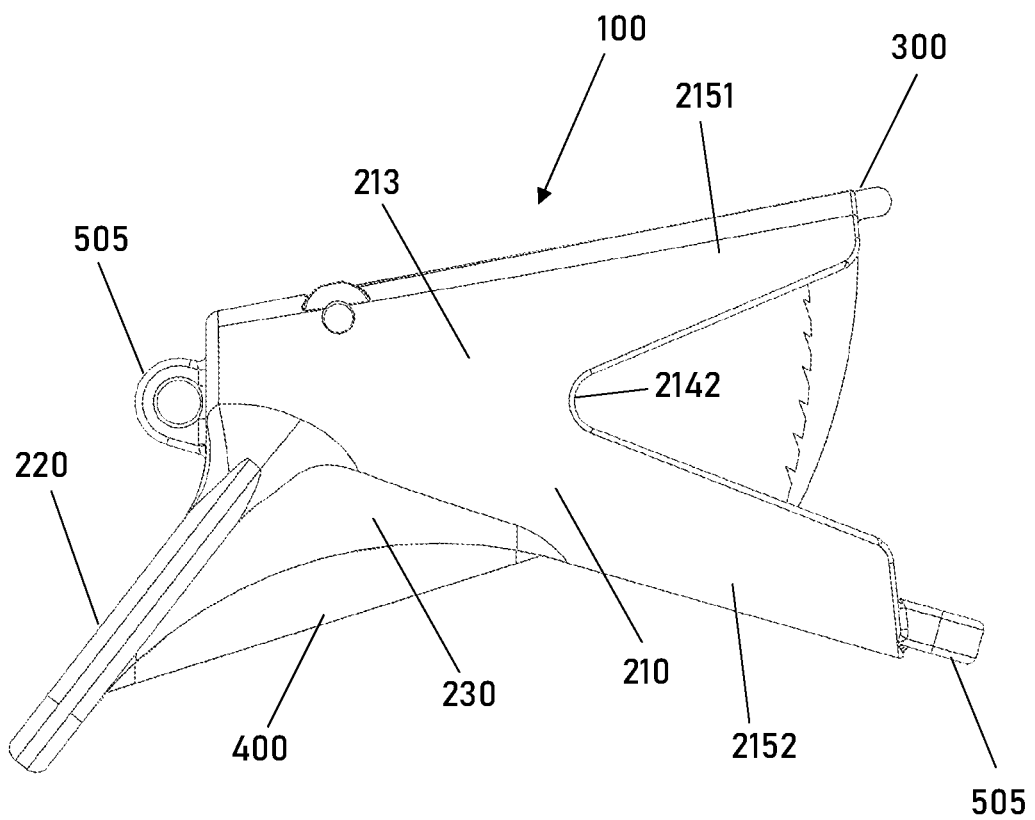
FIG. 3 sets forth a side view of trolling device 100.
Figure 4:
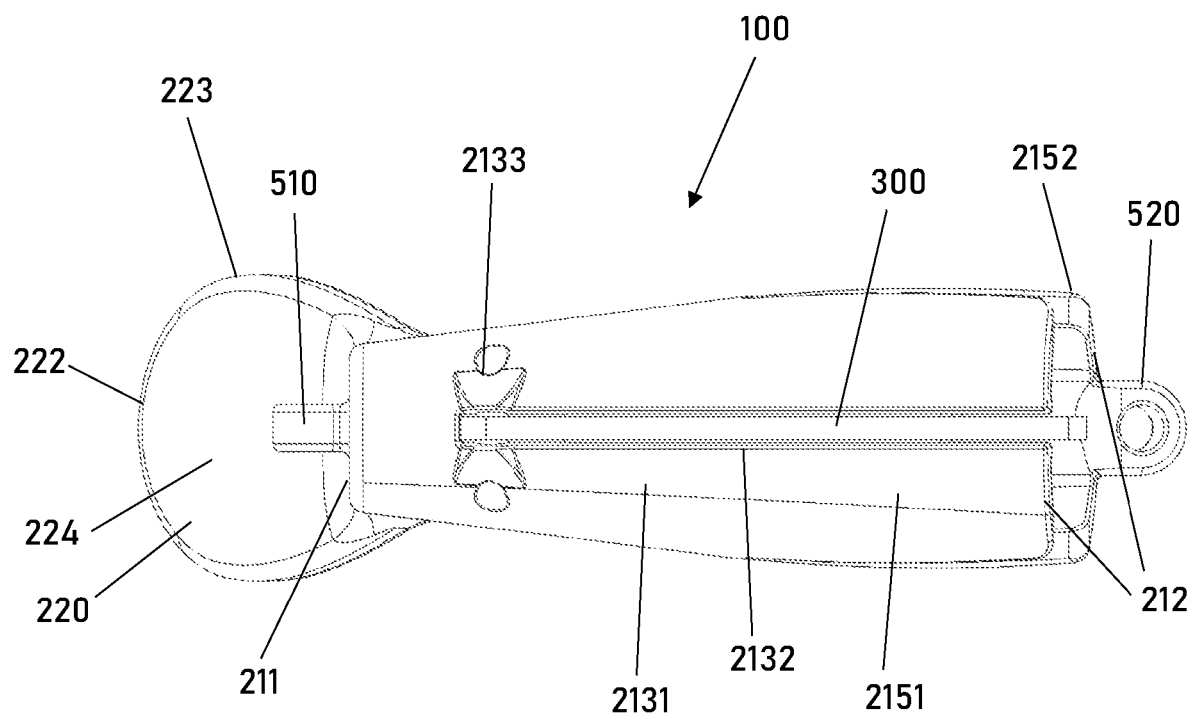
FIG. 4 sets forth a top view of trolling device 100.
Figure 5:
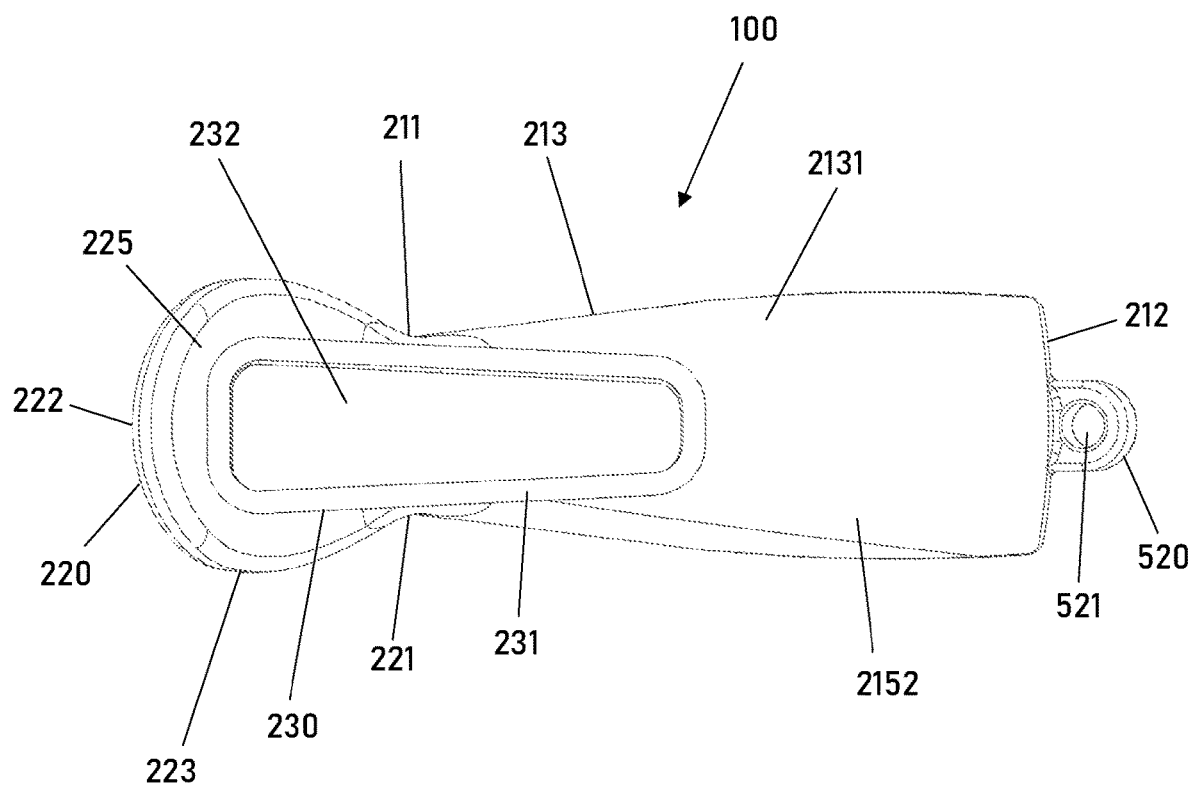
FIG. 5 sets forth a bottom view of trolling device 100.
Figure 6:
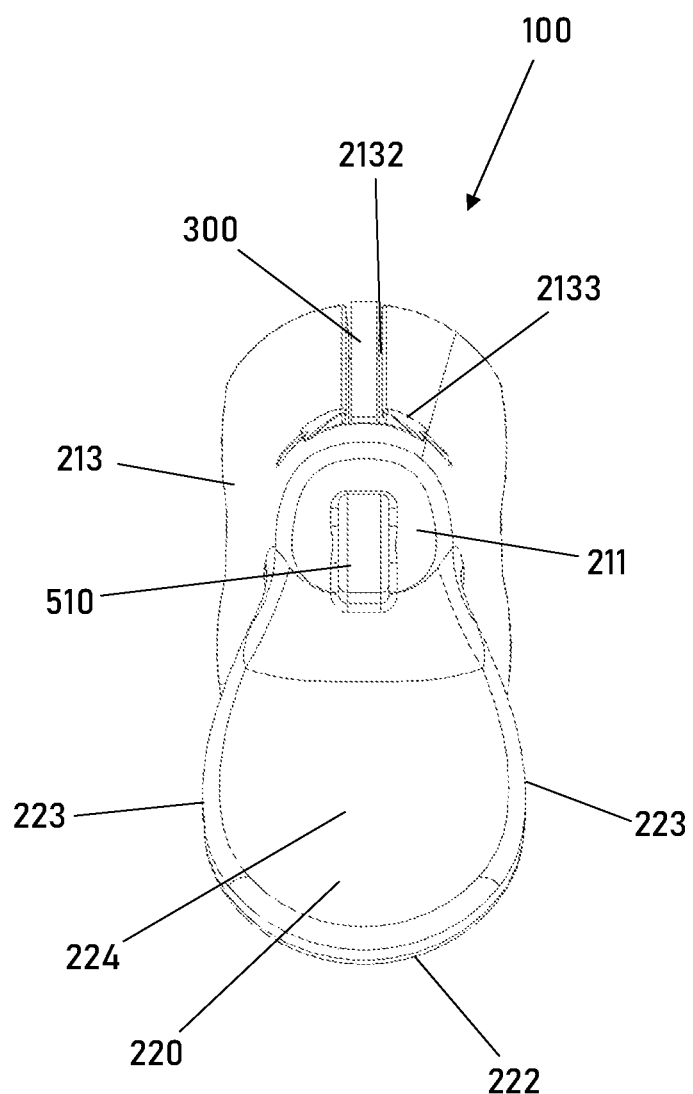
FIG. 6 sets forth a front view of trolling device 100.
Figure 7:
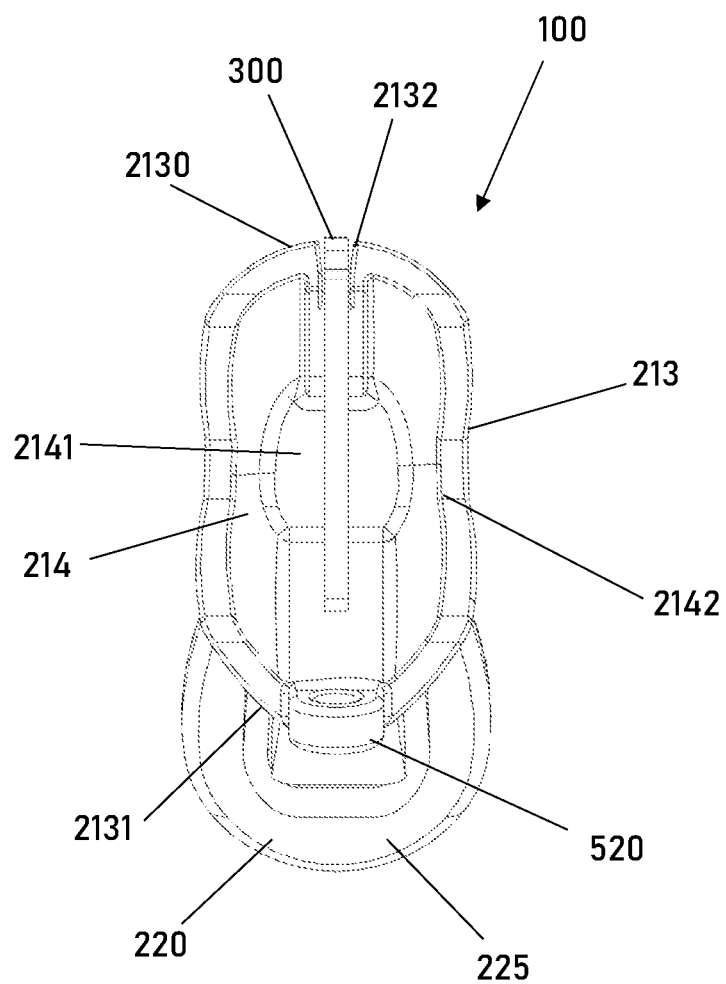
FIG. 7 sets forth a rear view of trolling device 100.
Figure 8:
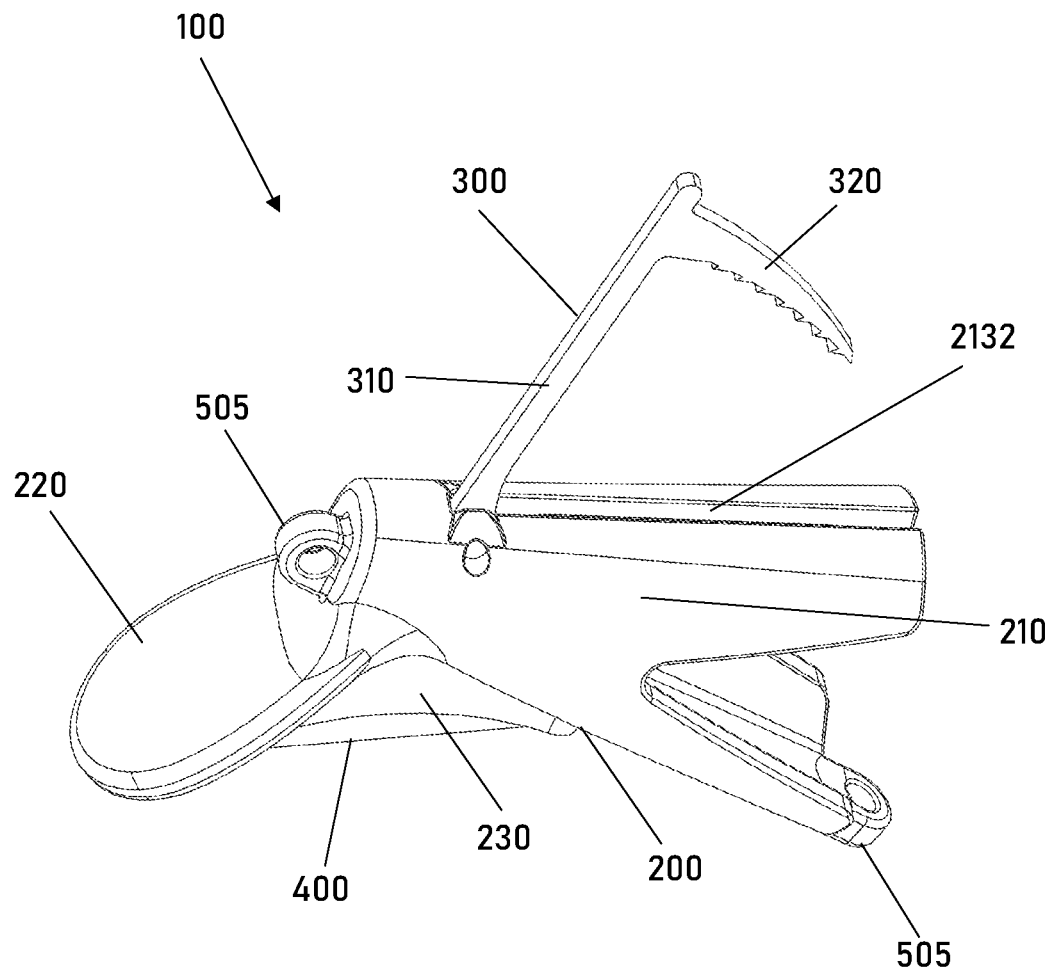
FIG. 8 sets forth a side perspective view of trolling device 100, wherein securer 300 is in a releasing configuration.
Figure 9:
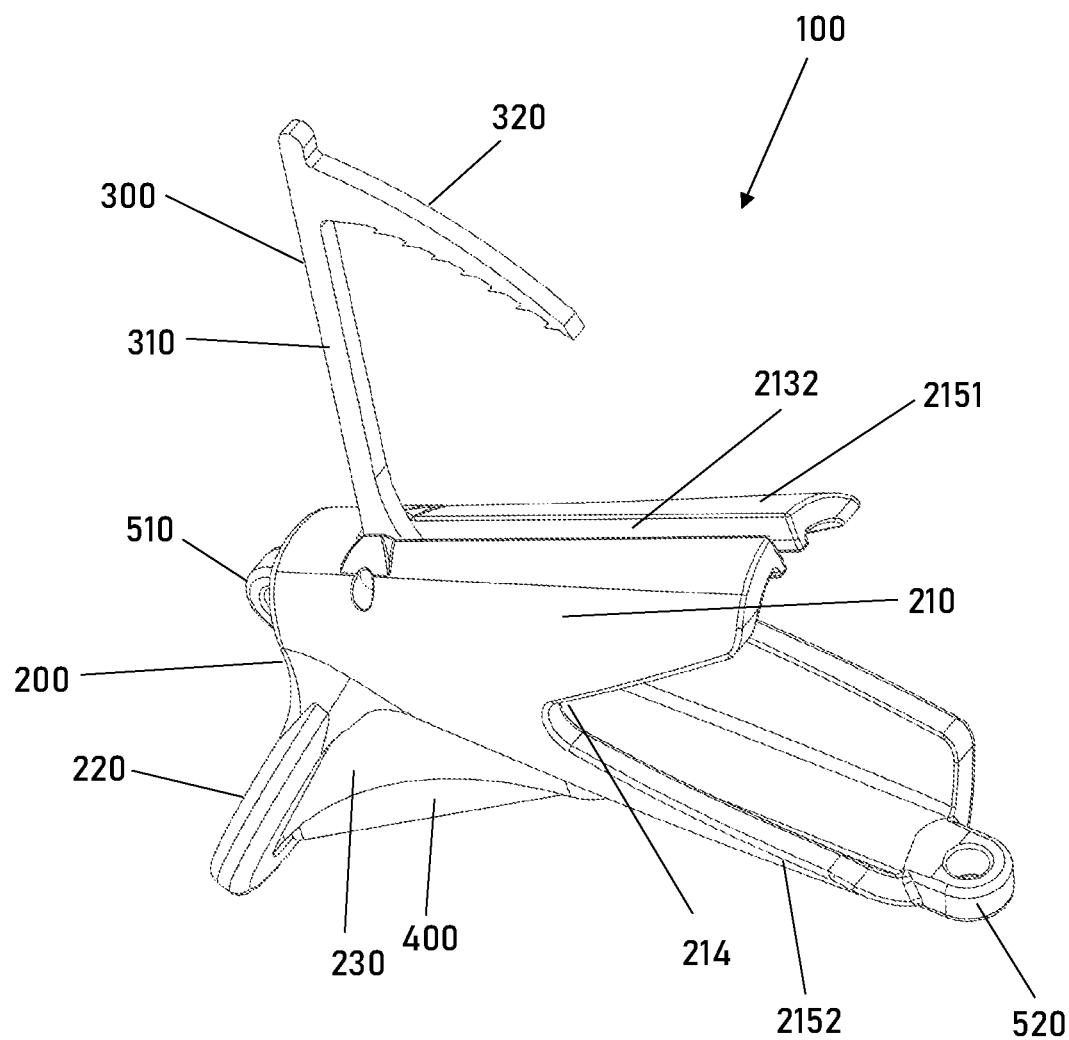
FIG. 9 sets forth an upper perspective view of trolling device 100, wherein securer 300 is in a releasing configuration.
Figure 10:
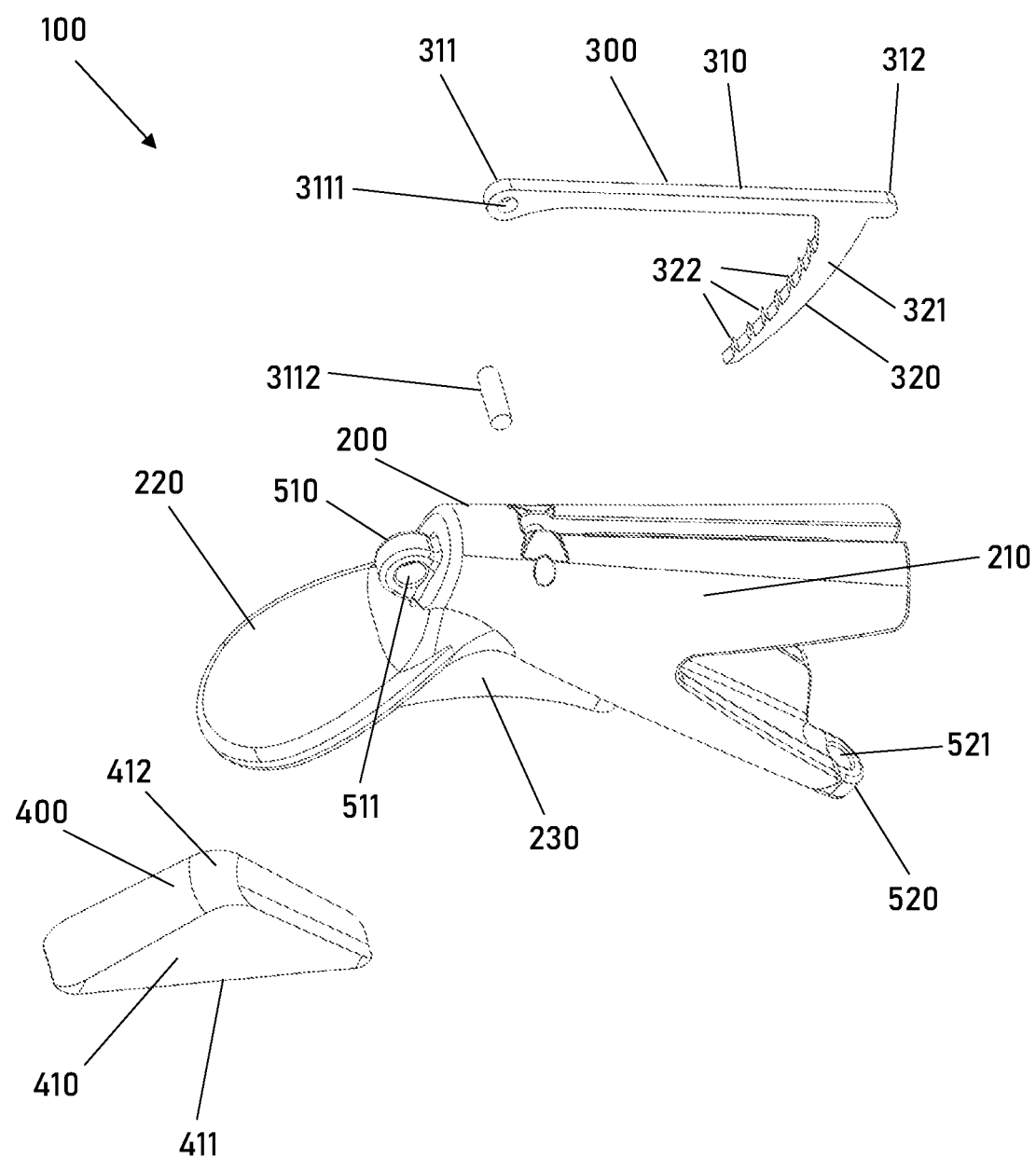
FIG. 10 sets forth an exploded perspective view of trolling device 100.
Figure 11:
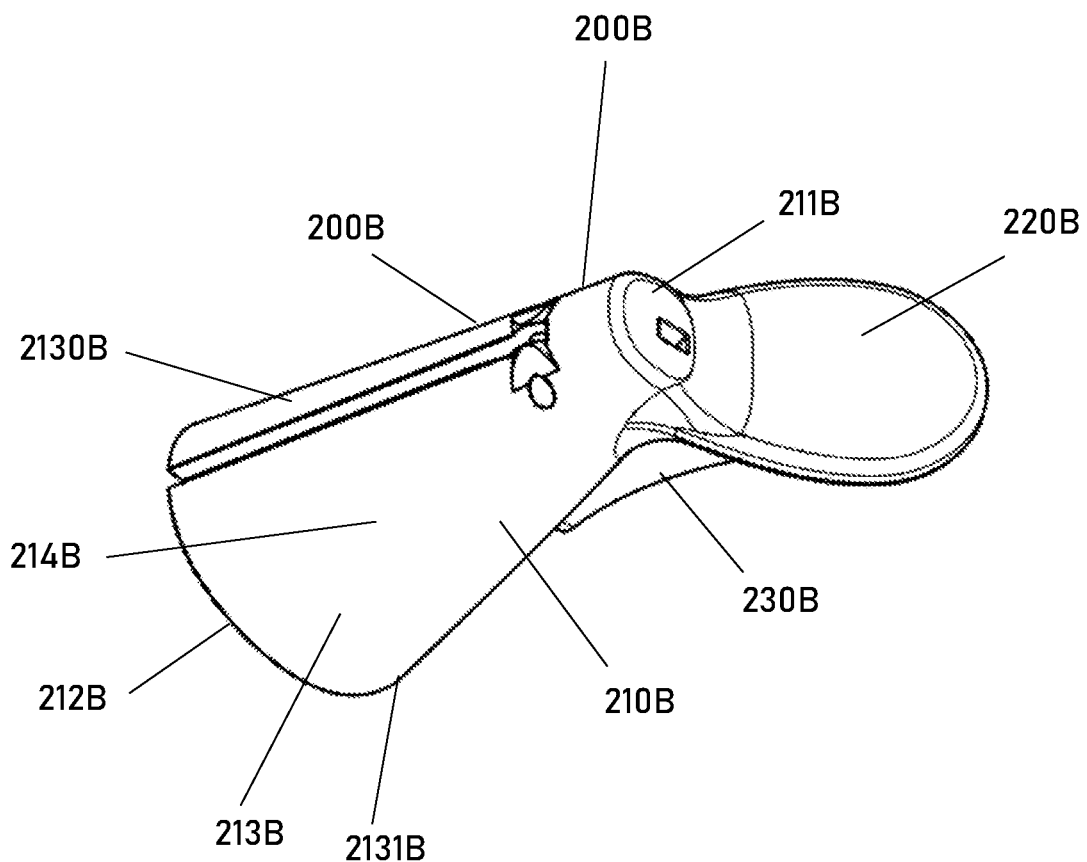
FIG. 11 sets forth a side perspective view of body 200 (200B) according to another embodiment of trolling device 100, which embodiment may be referred to as trolling device 100B.
Figure 12:
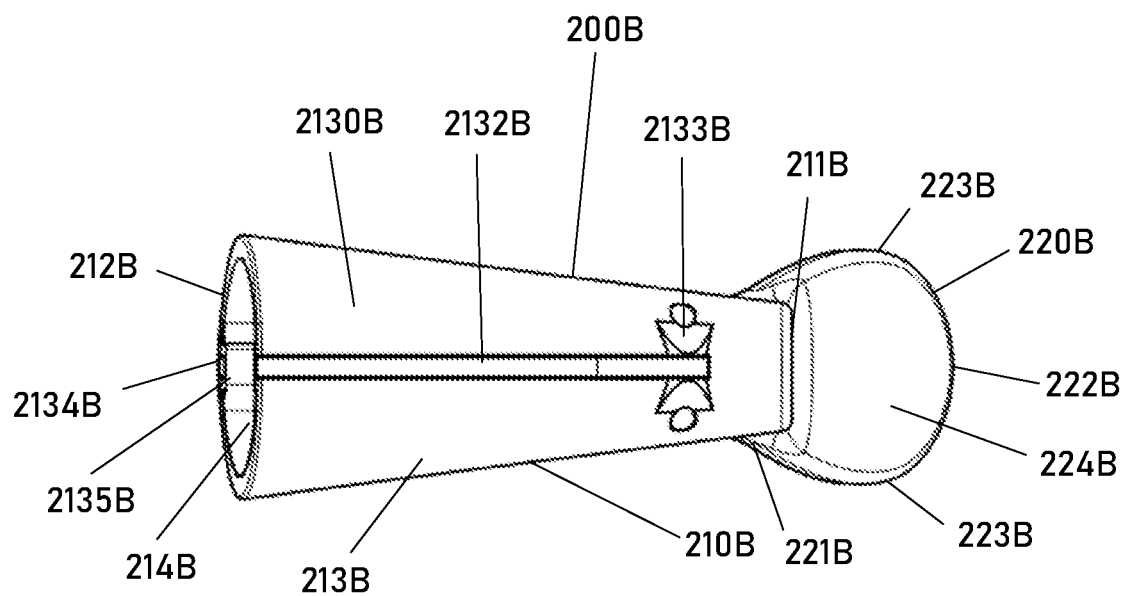
FIG. 12 sets forth a top view of body 200B of trolling device 100B.
Figure 13:
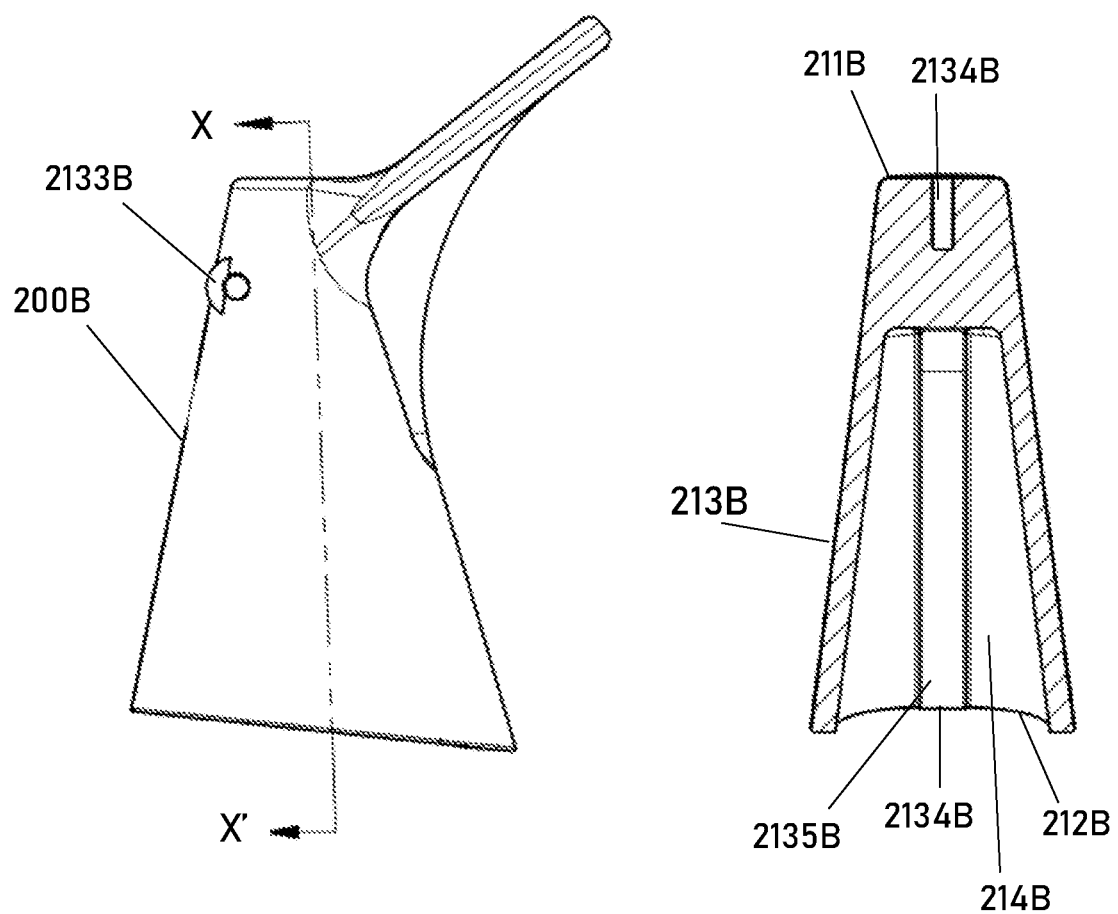
FIG. 13 sets forth a longitudinal sectional view of body 200B of trolling device 100B, along axis X to X'.
Figure 14:
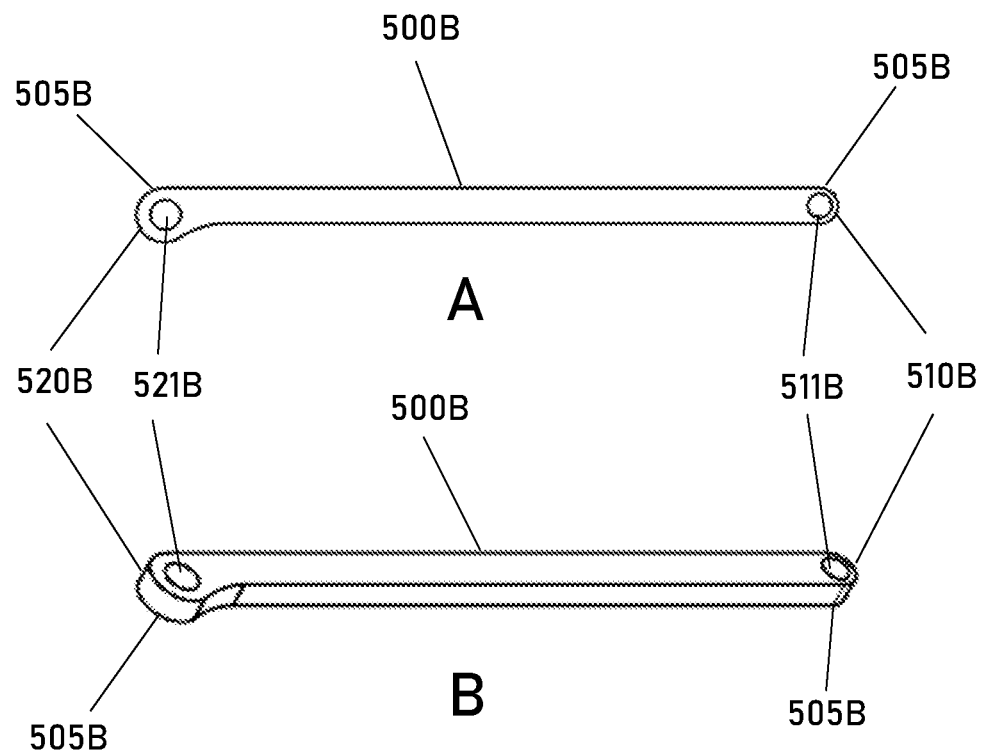
FIG. 14 sets forth (A) a side view; and (B) a side perspective view, of tackle support 500 (500B) of trolling device 100B.
Figure 15:
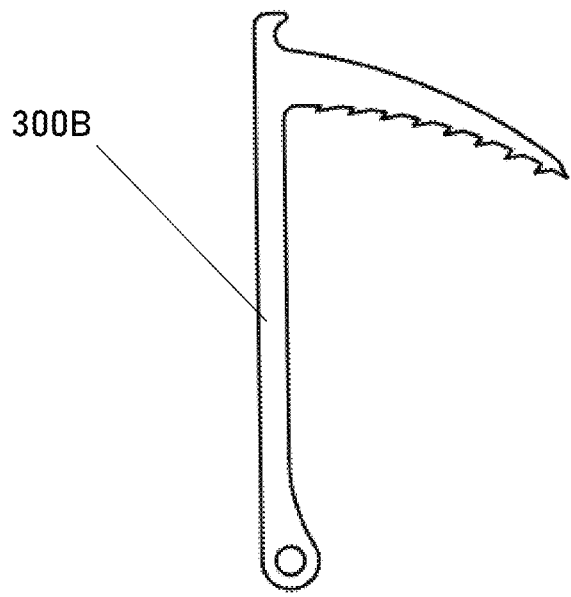
FIG. 15 sets forth a securer of trolling device 100B.
Figure 16:
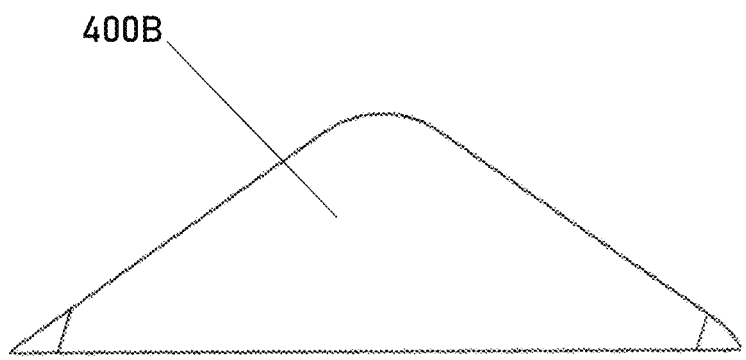
FIG. 16 sets forth a stabiliser of trolling device 100B.

FIG. 1 shows an embodiment of a trolling system according to an aspect of the invention, trolling system 10. Trolling system 10 comprises an embodiment of a trolling device according to an aspect of the invention, trolling device 100. Trolling system 10 further comprises gang hook 50; plastic lure 60; and leader 70. Dead bait fish 1 is connected with trolling device 100 and may (although need not) be considered a part of trolling system 10.

Trolling device 100 is shown in detail in FIGS. 2 to 10. Trolling device 100 comprises body 200; securer 300; stabiliser 400; and tackle connectors 505.

Body 200 of trolling device 100 comprises primary body portion 210; bib 220; and brace 230.

Primary body portion 210 of body 200 comprises front end 211; rear end 212; wall 213; cavity 214; and legs 215.

Wall 213 of primary body portion 210 of body 200 extends between front end 211 and rear end 212, forming cavity 214 and legs 215. Wall 213 comprise top wall portion 2130; and bottom wall portion 2131.

Cavity 214 of primary body portion 210 is bordered by wall 213. Cavity 214 is cone-like in shape, comprising narrower closed end 2141 towards front end 211 of primary body portion 210; and broader open end 2142 towards rear end 212 of primary body portion 210. With reference to cavity 214, front end 211 of primary body portion 210 may be referred to as a closed end, and rear end 212 of primary body portion 210 may be referred to as an open end.

Legs 215 comprise top leg 2151; and bottom leg 2152. Top wall portion 2130 extends along primary body portion 210 forming top leg 2151. Bottom wall portion 2131 extends along primary body portion 210 forming bottom leg 2152.

Primary body portion 210 of body 200 of device 100 further comprises securer slot 2132. Securer slot 2132 of extends along top leg 2151 and top wall portion 2130 of wall 213 from rear end 212 of primary body portion 210 to a position near to front end 211 of primary body portion 210. At the position near to front end 211, securer slot 2132 is aligned with securer mount 2133 for pivotable mounting of securer 300 as hereinbelow described.

Bib 220 of body 200 of device 100 is a paddle-like bib extending from front end 211 of primary body portion 210. Bib 220 angles downwards and away from bottom wall portion 2131 of wall 213.

Bib 220 comprises first or narrower bib end 221 fixed with front end 211 of primary body portion 210; second or broader bib end 222 away from front end 211 of core body portion 210; and bib sides 223 extending between narrower bid end 221 and broader bib end 222. Broader bib end 222 is a rounded end. Bib sides 223 are rounded sides. Bib 220 further comprises top bib surface 224; and bottom bib surface 225. Top bib surface 224 and bottom bib surface 225 are substantially flat surfaces.

Brace 230 of body 200 of device 100 comprises brace wall 231 surrounding brace void 232. Brace wall 231 and brace void 232 extend between bottom bib surface 225 of bib 220 at a position near to broader bib end 222 and bottom wall portion 2131 of wall 213 at a position about midway between broader bib end 222 of bib 220 and rear end 212 of primary body portion 210.

Securer 300 of trolling device 10 comprises connector 310; and insertion portion 320.

Connector 310 of securer 300 is an arm comprising first or proximal end 311; and second or distal end 312. Arm 310 of securer 300 comprises aperture 3111 at proximal end 311. Aperture 3111 is a circular aperture.

Insertion portion 320 of securer 300 is a barb comprising main spike 321; and a plurality of teeth 322. Main spike 321 is a curved and tapered spike extending away from arm 310 near to distal end 312. Teeth 322 are substantially triangular teeth angling upwards from main spike 321 in the direction of proximal end 311 of arm 310.

Proximal end 311 of arm 310 of securer 300 is connected with primary body portion 210 of body 200. More particularly, proximal end 311 of arm 310 is pivotally connected with securer mount 2133 of primary body portion 210, wherein pivot pin 3112 is mounted on securer mount 2133 and passes through aperture 3111 of proximal end 311 of arm 310.

Stabiliser 400 of trolling device 10 is a solid weight. Weight 400 comprises weight body 410 of an approximately triangularly prismatic shape.

An upper portion including peak 412 of triangularly prismatic weight body 410 is fixed within void 232 of brace 230 of body 200, wherein body 410 of weight 400 substantially fills void 232.

Substantially rectangular, substantially flat water-contact surface 411 of weight 400 projects out from brace 230 of body 200, extending between bottom bib surface 225 of bib 220 and bottom wall portion 2131 of wall 213.

Tackle connectors 505 of trolling device 10 comprise front tackle connector 510; and rear tackle connector 520. To avoid doubt, tackle connectors 505 may be considered components of body 200 of trolling device 10, or separate components.

Front tackle connector 510 is a ring or loop-like connector comprising aperture 511. Front tackle connector 510 is fixed with and protrudes from front end 211 of primary body portion 210 of body 200.

Rear tackle connector 520 is a ring or loop-like connector comprising aperture 521. Rear tackle connector is fixed with and protrudes from bottom leg 2152 at rear end 212 of primary body portion 210 of body 200.

Front tackle connector 510 and rear tackle connector 520 are substantially perpendicular, wherein aperture 511 of front tackle connector 510 opens substantially horizontally relative to body 200; and aperture 521 of rear tackle connector 520 opens substantially vertically relative to body 200.

Another embodiment of trolling device 100 is described with reference to FIGS. 11 to 16. Respective embodiments of trolling device 100 (and components thereof) as shown in FIGS. 2 to 10; and FIGS. 11 to 16, respectively, may be referred to using 'A' and 'B' suffixes, respectively.

Trolling device 100B is similar to trolling device 100A as hereinabove described. However, certain notable difference will be referred to as follows.

As for trolling device 100A, trolling device 100B comprises body 200 (body 200B); securer 300 (securer 300B) (FIG. 15); stabiliser 400 (stabiliser 400B) (FIG. 16); and tackle connectors 505 (tackle connectors 505B).

Notably, cavity 214B of primary body portion 210B of body 200B of trolling device 100B is comparatively larger relative to cavity 214A of primary body portion 210A of body 200A of trolling device 100A. More particularly, comparatively larger cavity 214B extends within substantially all of primary body portion 210B of body 200B from front end 211B to rear end 212B, as compared with comparatively smaller cavity 214A towards front end 211A; and legs 215A extending to rear end 212A, of primary body portion 210A of 200A.

It will be appreciated that core body portion 210B of body 200B is substantially cone-shaped, whereas, due to the comparatively smaller sized cavity 214A and presence of legs 215A, core body portion 210A is substantially V-shaped.

Notably, core body portion body 210B of trolling device 100B comprises tackle support channel 2134B. Tackle support channel 2134B extends along bottom wall portion 2131B of wall 213B from rear end 212B of core body portion 210B through front end 211B of body portion 210B. Tackle support channel 2134B is bordered by channel housing 2135B.

Notably, tackle connectors 505B of trolling device 100B are of respective ends of tackle support 500B. Tackle support 500B of trolling device 100B is in the form of a shaft comprising front tackle connector 510B at a first end thereof; and second connection end 520B at a second end thereof.

Front tackle connector 510B of shaft 500B comprises aperture 511B. Rear tackle connector 510B of shaft 500B comprises aperture 521B. Rear tackle connector 520B and aperture 521B thereof are somewhat enlarged relative to front tackle connector 510B and aperture 511B thereof.

Tackle support 500B extends through tackle support channel 2134B of core body portion 210B of body 200B. Front tackle connection end 510B protrudes from front end 211B of core body portion 210B. Rear tackle connection end 520B protrudes from rear end 212B of core body portion 210B.

Front tackle connector 510B and rear tackle connector 520B are substantially parallel, wherein aperture 511B of front tackle connector 510B and aperture 521B of rear tackle connector 520B open substantially horizontally relative to body 200B.

Typical use of trolling devices and systems of the invention will now be described.

Trolling device 100 is typically used for recreational or sports fishing with a suitable rod and line arrangement. More particularly, trolling device 100 can be used for recreational or sports fishing targeting relatively large pelagic fish such as tuna, mackerel, kingfish, and dolphin fish, although without limitation thereto.

In use, trolling device 100 is connected with suitable line, such as fishing line of a suitable reel arrangement. More particularly, line is connected directly or indirectly (e.g. using a leader arrangement) with aperture 511 of front tackle connector 510 of trolling device 100. In some typical embodiments, a wire leader connected to line is attached to aperture 511 of front tackle connector 510.

In use, typically, one or more hooks are connected with rear tackle connector 520 trolling device 100. Typically, the one or more hooks are connected directly or indirectly (e.g. using a snap clip or swivel or the like) with aperture 521 of rear tackle connector 520. In some typical embodiments, a gang hook arrangement is attached with aperture 521 of rear tackle connector 520.

In use, dead bait is connected with trolling device 100. Typically, the dead bait is a bait fish such as a sardine or pilchard, as exemplified in system 10 described herein. Typically, a head, or a part thereof, of the dead bait fish is inserted into cavity 214 of core body portion 210 of body 200, and secured with securer 300.

In typical embodiments wherein the dead bait is a bait fish, the head or part thereof of the bait fish is inserted into cavity 214, and arm 310 of securer 300 is pivoted into the securing position, wherein barb 320 of securer 300 is inserted into an upper or dorsal part of the head of the bait fish.

In typical embodiments wherein the dead bait is a bait fish, the one or more hooks, such as the gang hook connected with rear tackle connector 520, is inserted into a ventral or abdominal portion of the bait fish.

In some embodiments, a lure, such as a soft plastic lure, is connected with trolling device 100. The lure may be connected directly or indirectly to front tackle connector 510 or rear tackle connector 520. By way of non-limiting example, system 10 as described herein comprises soft plastic lure 60 connected with trolling device 100 via leader 70, wherein leader 70 is connected with front tackle connector 510.

With dead bait added to trolling device 100 and trolling device 100 connected with line, trolling is performed wherein trolling device 100 is moved through water, such as ocean water, to catch fish.

As trolling device 100 is moved through water, bib 220 actions trolling device 100, stabiliser 400 stabilises actioning trolling device 100 in a substantially upright orientation, and securer 300 secures the dead bait to actioning trolling device 100.

In typical embodiments wherein dead bait in the form of a bait fish (such as a pilchard or sardine or the like) is added to trolling device 100, in use, actioning trolling device 100 moves the secured bait fish in a manner resembling live swimming of the bait fish. In embodiments wherein a lure is connected with trolling device 100 and dead bait in the form of a bait fish is added to the trolling device, in use, actioning trolling device can move the secured bait fish and lure in a manner resembling the bait fish chasing the lure or vice versa.

In use, fish are attracted to the actioning, stabilised trolling device 100 and dead bait connected thereto, typically by sight, smell, and taste. In use, when attempting to feed on the dead bait, fish can become hooked on the one or more hooks connected to the trolling device, such as the gang hook arrangement, and can be reeled in using the rod and reel arrangement.

In some typical embodiments, trolling device 100 is used for sports fishing from a recreational boat, such as a cruiser or the like. Suitably, trolling device 100 may be used for ocean trolling from a recreational boat with an appropriate sports fishing rod and reel arrangement.

In some typical embodiments, trolling device 100 is used for trolling from a personal watercraft, such as a jet ski, kayak, or canoe. Suitably, trolling device 100 may be used for ocean trolling from a personal watercraft using an appropriate fishing pole and line and/or reel arrangement. Typically, movement of the watercraft is used for trolling of trolling device 100 connected to line, wherein the line is connected to the watercraft or a pole and line and/or reel arrangement mounted to or held within the watercraft.

Certain non-limiting advantages of at least typical embodiments of trolling devices and/or systems of the invention, such as described herein, will now be described.

The arrangement of securer 300 and cavity 214 of core body portion 210, as described herein, can be advantageous for connecting and securing dead bait with trolling device 100, particularly substantially whole dead bait fish such as pilchards or sardines or the like. Insertion of the head of a bait fish, or a part thereof, into cavity 214, and pivoting of securer 300 to insert barb 320 in the head or part thereof of the bait fish, allows for dead bait fish to be connected and secured with trolling device 100 quickly and simply. Additionally, insertion of barb 320 into a dorsal portion of the head of a bait fish wherein the head of the bait fish, or a part thereof, is inserted into substantially cone-shaped cavity 214, has been observed to be advantageous for secure connection of the bait fish.

The arrangement of securer 300 and chamber 214, as hereinabove described, in combination with the arrangement of tackle connectors 505, can be advantageous for actioning of trolling device 100 and dead bait connected thereto. More specifically, securing of the head of a bait fish inserted into cavity 214 by insertion of barb 320 into a dorsal portion of the head of the bait fish, in combination with insertion of one or more hooks connected with rear tackle connector 520 into a ventral or abdominal portion of the bait fish, can be advantageous for producing movement resembling live swimming of the bait fish as trolling device 100 is actioned through water. The ability of the one or more hooks, such as gang hook 50, to move substantially freely with the body portion of the bait fish is considered advantageous in this respect.

The arrangement of stabiliser 400 and body 200, as described herein, can be advantageous for actioning of trolling device 100 and dead bait connected thereto. More specifically, spanning of a region between bottom bib surface 225 of bib 220 of body 200 and bottom wall portion 2131 of core body portion 210 of body 200 by stabiliser 400 has been observed to be advantageous for stabilising trolling device 100 and a substantially whole dead bait fish connected thereto, such that the trolling device is maintained substantially upright (and spinning is avoided or at least constrained) during trolling. Substantially complete filling of a void between bib 220 and core body portion 210 is considered advantageous in this respect. The presence of substantially flat water-contact surface 411 extending between bottom bib surface 225 of bib 220 and bottom wall portion 2131 of core body portion 210 is considered advantageous in this respect.

As hereinabove described, core body portion 210B of body 200B of trolling device embodiment 100B is substantially cone-shaped, whereas, due to the comparatively smaller size cavity 214A and the presence legs 215A, core body portion 210A of body 200A of trolling device embodiment 100A is substantially V-shaped. In at least some circumstances, substantially V-shaped core body portion 210A of trolling device 100A may be advantageous for allowing head parts or details (e.g. eye; mouth) of a dead bait fish to be visible to fish during trolling with trolling device 100A. In at least some circumstances, visibility of head parts or details may increase attractiveness of a trolling system comprising trolling device 100A to fish, such as relatively large pelagic fish e.g. tuna, mackerel, kingfish, and dolphin fish, although without limitation thereto.

As hereinabove described, tackle connectors 505A and 505B of trolling device embodiments 100A and 100B, respectively, take somewhat different forms. More particularly, front tackle connector 510A of body 200A of trolling device embodiment 100A is fixed with from front end 211A of primary body portion 210A of body 200A; and rear tack of connector 520A of body 200A of trolling device embodiment 100A is fixed with bottom leg 2152A at rear end 212A of primary body portion 210A of body 200A. In comparison, front tackle connector 510B and rear tackle connector 520B of body 200B of trolling device embodiment 100B are of respective ends of tackle support 500B in the form of a shaft.

It will be appreciated that the form of tackle connectors 505A of trolling device 100A may, in at least some circumstances, be preferred or advantageous for simplicity of manufacture. It will be further appreciated that the respective forms of tackle connectors 505A and 505B may affect properties of trolling device 100 or body 200 thereof, such as durability, weight, stiffness, and/or flexibility, which will also be at least partly dependent on particular materials used for construction of trolling device 100 and components thereof, as further discussed hereinbelow.

It will be understood generally that the above description of embodiments of the invention is provided for purposes of description to one of ordinary skill in the related art. It is not intended to be exhaustive or to limit the invention to a disclosed embodiment or embodiments. In some instances, well-known components and/or processes have not been described in detail, so as not to obscure the embodiments described herein.

In relation to material used for construction of trolling device 100, the skilled person will readily understand that a range of suitable materials can be used. In some typical embodiments, body 200 is formed from or comprises aluminium. In some typical embodiments, body 200 is formed from or comprises stainless steel. In some typical embodiments, body 200 is formed from or comprises a suitable marine plastic or the like. Typically, securer 300 is formed from or comprises stainless steel, although without limitation thereto. Typically, stabiliser 400 is formed from or comprises lead or a similar relatively dense metal or composite, although without limitation thereto.

In typical embodiments of trolling device 100A, tackle connectors 505A are formed from the same (or substantially the same) material as body 200A and may be considered a part of body 200A. That is, tackle connectors 505A and body 200A may be of unitary construction.

In typical embodiments of trolling device 100B, tackle connectors 505B are of tackle support 500B are formed from or comprise stainless steel. Suitably, body 200B and tackle support 500B are modular components. It will be appreciated that a modular arrangement of body 200B and tackle support 500B may, in some circumstances, advantageously allow for properties such as durability, weight, stiffness, and/or flexibility of trolling device 100B, or body 200B thereof, to be adjusted or modified based on material used for construction of tackle support 500B alone or in combination with material used for construction of body 200B.

As described, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations that have been discussed herein, and other embodiments that fall within the spirit and scope of the invention.

It will be appreciated that, although certain properties of primary body portion 210 of trolling device 100 may be advantageous as herein described, specific size and/or shape of the primary body portion 210 may be varied, such as to accommodate specific dead bait such as bait fish.

It will be appreciated that, although a bib arrangement is considered advantageous for actioning in the context of trolling device 100 as herein described, specific size, shape, and/or angle of bib 230 may be varied, such as to facilitate actioning resembling live swimming of specific bait dish. Although bib 230 as herein described is fixed with core body portion 210, in some alternative embodiments an exchangeable bib arrangement may be used.

It will further be appreciated that, although certain properties of stabiliser 400 may be advantageous as herein described, specific size, shape, and/or weight of stabiliser 400 may be varied, such as to suit specific size or weight of dead bait such as bait fish, and/or to facilitate actioning resembling live swimming of specific bait fish. Although stabiliser 400 as herein described is fixed with core body portion 210, in some alternative embodiments an exchangeable stabiliser arranger may be used.

In this specification, the use of the terms "suitable" and "suitably", and similar terms, is not to be read as implying that a feature or step is essential, although such features or steps may well be preferred.

In this specification, the indefinite articles "a" and "an" are not to be read as singular indefinite articles or as otherwise excluding more than one or more than a single subject to which the indefinite article refers. For example, "a" surface includes one surface, one or more surface, and a plurality of surfaces.

In this specification, the terms "comprises", "comprising", "includes", "including", and similar terms, are intended to denote the inclusion of a stated integer or integers, but not necessarily the exclusion of another integer or other integers, depending on context. That is, a device, system, or method, etc., that comprises or includes stated integer(s) need not have those integer(s) solely, and may well have at least some other integers not stated, depending on context.

In this specification, the terms "consisting essentially of" and "consists essentially of" are intended to mean a non-exclusive inclusion only to the extent that, if additional elements are included beyond those elements recited, the additional elements do not materially alter basic and novel characteristics. That is, a device, system, or method that "consists essentially of" one or more recited elements includes those elements only, or those elements and any additional elements that do not materially alter the basic and novel characteristics of the apparatus, system, or method.

In this specification, terms such as "above" and "below"; "front" and "rear"; "top" and "bottom"; "upper" and "lower"; "left" and "right"; "horizontal" and "vertical", and the like, may be used for descriptive purposes. However, it will be understood that embodiments can potentially be arranged in various orientations, and that such relative terms are not limiting and may be interchangeable in appropriate circumstances.

In this specification, unless the context requires otherwise, the terms "connection", "connected", "connecting", and the like, are not to be read as limited to direct connections and may also include indirect connections. For example, unless the context requires otherwise, a stated first component "connected" to a stated second component may be connected via, through, or by, one or more unstated components.

The invention claimed is:

1. A trolling device comprising:
a body for receiving dead bait fish, the body comprising a front body end, a rear body end, a top wall portion, and a bottom wall portion;
a securer for releasably securing the dead bait fish received by the body, the securer comprising an arm connected at or near the top wall portion of the body, and a barb for extension relatively away from the top wall portion of the body and relatively towards the bottom wall portion of the body when securing the dead bait fish;
a bib for actioning of the device during trolling, the bib extending downwards and outwards at or near the front body end of the body from the bottom wall portion of the body; and
a stabiliser behind the bottom surface of the bib, the stabiliser comprising a weight and a substantially flat water-contact surface, the weight and the substantially flat water-contact surface of the stabiliser for stabilising the device during trolling, wherein the substantially flat water-contact surface of the stabiliser extends from the bottom wall portion of the body to the bottom surface of the bib,
wherein the connection of the arm of the securer with the body facilitates pivoting of the securer between a securing configuration for securing the dead bait fish received by the body, and a releasing configuration for releasing the dead bait fish, wherein the pivoting of the securer is substantially restricted to a single plane.

2. The trolling device of claim 1, wherein the body comprises a body cavity for receiving the dead bait fish, the body cavity bordered by one or more body walls comprising the top wall portion and the bottom wall portion.

3. The trolling device of claim 1, wherein the front body end is a closed end, and the rear body end is an open end, and wherein the body narrows towards the front body end.

4. The trolling device of claim 1, wherein the body of the device, or a portion thereof, is substantially cone-shaped.

5. The trolling device of claim 1, wherein the body of the device comprises a top leg and a bottom leg extending to the rear body end in a V-like configuration.

6. The trolling device of claim 1, wherein the barb of the securer is for insertion into the dorsal portion of the head of the dead bait fish and comprises a main spike and a plurality of teeth extending from the main spike in a sawtooth configuration.

7. The trolling device of claim 1, wherein the weight of the stabiliser is a substantially solid weight.

8. The trolling device of claim 1, comprising one or more tackle supports and/or tackle connectors for connection of line and/or tackle with the device, optionally wherein the one or more tackle supports and/or tackle connectors comprise a front tackle connector at or near the front body end of the device; and a rear tackle connector at or near the rear body end of the device.

9. The trolling device of claim 1, comprising a brace extending between the bottom wall portion of the body and the bottom surface of the bib, wherein the stabiliser comprises the brace, or is connected or connectable with the brace.

10. The trolling device of claim 9, wherein the weight of the stabiliser is fixed with the brace.

11. A system comprising the trolling device of claim 1 and at least one of (a) fishing line and/or tackle and (b) dead bait, wherein the at least one of (a) and (b) is connected with the trolling device.

12. A kit comprising the trolling device of claim 1; and fishing line and/or tackle for connection with the trolling device.

13. A method of fishing, including a step of trolling with a dead bait fish connected to the trolling device of claim 1.

14. The method of claim 13, including a step of actioning the trolling device wherein movement of the dead bait fish connected to the trolling device through water resembles live swimming of the bait fish.

15. The trolling device of claim 1, wherein the substantially flat water-contact surface of the stabiliser is a bottom surface of the weight.

16. The trolling device of claim 1, wherein the stabiliser substantially fills a void between the bottom wall portion of the body and the bottom surface of the bib.

17. The trolling device of claim 1, wherein the top wall portion of the body comprises a securer slot into, through, or from which the securer or the securer arm substantially fittingly moves between the releasing configuration and the securing configuration.

18. The trolling device of claim 1, wherein the connection of the arm of the securer with the body of the device is at or near a first end of the arm; and the barb extends from at or near a second opposite end of the arm.

19. The trolling device of claim 1, wherein the arm of the securer is substantially rigid.

\* \* \* \* \*